Figure 1:
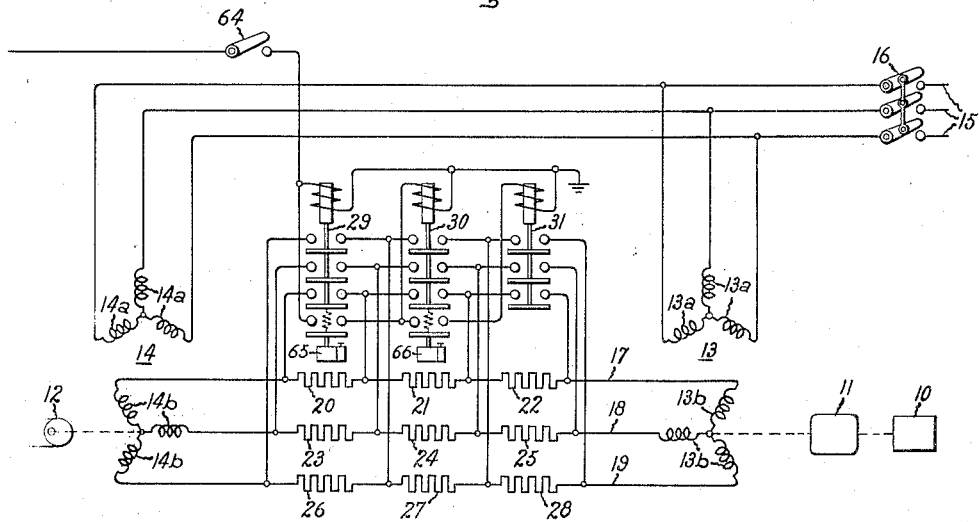

Dec. 27, 1938.  D. R. SHOULTS  2,141,939

CONTROL SYSTEM

Filed Oct. 1, 1937  2 Sheets-Sheet 1

Inventor:
David R. Shoults,
by Harry E. Dunham
His Attorney.

Dec. 27, 1938.     D. R. SHOULTS     2,141,939
CONTROL SYSTEM
Filed Oct. 1, 1937     2 Sheets-Sheet 2

Inventor:
David R. Shoults,
by Harry E. Dunham
His Attorney.

Patented Dec. 27, 1938

2,141,939

UNITED STATES PATENT OFFICE 2,141,939

CONTROL SYSTEM

David R. Shoults, Schenectady, N. Y., assignor to General Electric Company, a corporation of New York Application October 1, 1937, Serial No. 166,784

8 Claims. (Cl. 172—239)

This invention relates to control systems, more particularly to control systems for electrical motion transmitting and receiving apparatus, and it has for an object the provision of a simple, reliable and improved system of this character.

Apparatus of this nature usually comprises a plurality of units that are physically similar to polyphase wound rotor induction motors. One of these units is driven by suitable driving means and constitutes the driven unit or transmitter unit. Another unit is required to drive a load synchronously with the driven unit and constitutes the receiver unit or drive unit. Such units are often referred to as synchro-tie units because of their properties of remaining in synchronism with each other and forming a synchronous tie between two or more objects or devices which it is desired to operate in synchronism.

In the application of wound rotor induction motors to synchronous drives, the practice in the past has been to synchronize the drive unit with the driven unit at standstill, and then to apply the driving power to the driving means for the driven unit thereby accelerating the driven unit and causing the drive unit to follow and drive the load in synchronism with the driven unit. Heretofore, if the driven unit was running at its usual or normal speed and the drive unit was connected in the circuit at standstill, the operation of the equipment was erratic, in that the drive unit might or might not accelerate. If it did accelerate, the rotation was in the wrong direction as often as it was in the right direction. Such erratic behavior imposed the restriction in the operation of apparatus of this character that the driven unit and drive unit must always be synchronized at standstill before either unit could be started. There are many applications, however, in which the driven unit is required to operate at times when the drive unit is not required to operate, and in which at other times the drive unit and the driven unit are required to operate in synchronism. In these applications it is often desirable to accelerate and synchronize the drive unit with the driven unit without stopping the driven unit.

Accordingly, a further object of the invention is the provision of means for causing the drive unit or receiver unit to accelerate from rest in the correct direction and to synchronize with a transmitter that is being driven at a substantial speed.

In carrying the invention into effect in one form thereof, the primary winding of an electrical motion transmitting device is connected to a source of supply and means are provided for driving its rotor member at a suitable speed. An electrical motion receiving device has its primary winding connected to the supply source and its secondary winding connected to the secondary winding of the transmitting device whereby torques are produced that tend to rotate the rotor of the receiving device in opposite directions, and means are provided for increasing the torque tending to rotate the rotor of the receiving device in a direction corresponding to the direction of rotation of the rotor of the transmitting device and for reducing the torque tending to rotate the rotor of the receiving device in the opposite direction.

In illustrating the invention in one form thereof it is shown as applied in a conveyor system. It will be understood, however, that the invention has other applications.

Figure 2:
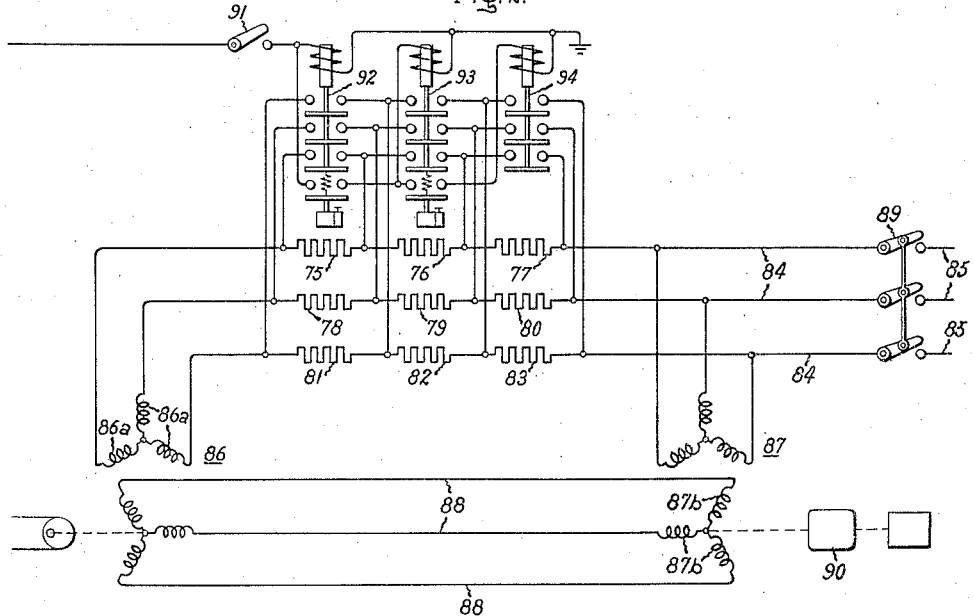
Figure 3:
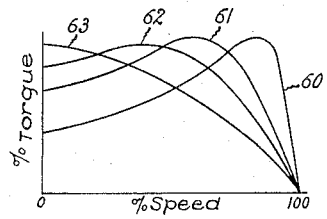

For a better and more complete understanding of the invention, reference should now be had to the following specification and to the accompanying drawings in which Fig. 1 is a simple diagrammatical illustration of an embodiment of the invention, Fig. 2 is a simple diagrammatical illustration of a modification, Fig. 3 is a chart of speed-torque characteristic curves of a wound rotor induction motor, and Figs. 4 to 9 inclusive are simple diagrammatical sketches utilized for illustrating and explaining the operation of the invention.

Referring now to the drawings, a machine or piece of apparatus 10 is driven by suitable driving means illustrated as an electric motor 11 at a speed which is preferably substantially constant at any value to which it may be adjusted. Motor 11 may be of any suitable type and may be supplied from any suitable source (not shown). For example, motor 11 may be a direct current motor supplied from an adjustable voltage generator or it may be supplied from a constant voltage source and provided with field weakening resistance.

In the application selected for illustration, a piece of apparatus such as the conveyor 12, remotely situated with respect to motor 11, is to be accelerated from rest and driven synchronously with apparatus 10.

To this end an electrical motion transmitting system is connected between the shaft of motor 11 and the driving drum of conveyor 12. This motion transmitting system comprises an electrical motion transmitting device 13 and an electrical motion receiving device 14. The transmitting device is provided with a polyphase primary winding 13a and with a polyphase secondary winding 13b. Similarly, the receiving device 14 is provided with polyphase primary and secondary windings 14a and 14b respectively.

The primary windings 13a and 14a of the transmitting and receiving devices are connected to a suitable polyphase source of power 15 through a suitable switching device 16. Corresponding phases of the secondary windings 13b and 14b of the transmitting and receiving devices respectively are connected to each other by means of electrical connections 17, 18, and 19.

The rotor member of the transmitting device 13 is connected to the drive shaft of the motor 11, and the rotor member of the receiving device 14 is connected to the conveyor driving drum 12. While in the arrangements disclosed, the primary windings of the transmitting and receiving devices are arranged on the stator members and the secondary windings arranged on the rotor members, the opposite arrangement may be utilized if desired. That is to say, the primary windings may be placed on the rotor members and the secondary windings may be placed on the stator members. As thus constructed, it will be noted that transmitter 13 and receiver 14 are physically similar to polyphase wound rotor induction motors.

When the disconnect switch 16 is closed to connect the polyphase primary windings 13a and 14a to the polyphase source 15, the current flowing in the primary windings 13a and 14a produces rotating magnetic fields. Assuming that the motor 11 is rotating in such a direction that the rotor member of the transmitting device 13 is turning in the same direction as the rotating magnetic field produced by the primary winding, it is necessary that the rotor member of the receiving device 14 should be accelerated in the same direction as the direction of rotation of the rotating magnetic field produced by its primary winding.

In order to accelerate the rotor member of the receiving device 14 in the direction of rotation of the primary rotating magnetic field, means are provided for increasing the torque that tends to produce rotation of the rotor member in the direction of rotation of the primary rotating magnetic field and for reducing the torque that tends to produce rotation of the rotor member of the receiving device in the opposite direction. These means are illustrated as comprising a plurality of resistors connected in series relationship in the connections 17, 18, and 19 between the corresponding phases of the secondary windings of the transmitting and receiving devices. As shown, resistors 20, 21, and 22 are connected in series in the connection 17, resistors 23, 24, and 25 are connected in series in the connection 18, and resistors 26, 27, and 28 are connected in series in the connection 19. Switching devices 29, 30, and 31 are provided for progressively short circuiting the resistances. Switching device 29 in its closed position short circuits resistors 20, 23, and 26, switching device 30 when closed short circuits resistors 21, 24, and 27, and switching device 31 in its closed position short circuits resistors 22, 25, and 28.

Figure 4:
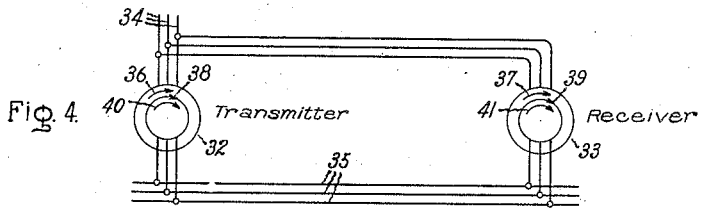

The manner in which the resistors 20 to 28 inclusive function to increase the torque tending to produce rotation in the direction of the primary magnetic field and to reduce the torque tending to produce rotation in the opposite direction will be more clearly understood by referring to the diagrammatic sketches shown in Figs. 3, 4, 5, and 6. In Fig. 4 the transmitter 32 and the receiver 33 correspond to the transmitter 13 and the receiver 14 of Fig. 1. Their primary windings (not shown) are connected to a source 34 and similarly, corresponding phases of their rotor windings are connected together by means of electrical connections 35. The direction of rotation of the primary magnetic field is represented diagrammatically by the arrows 36, 37. The rotor of the transmitter is assumed to be driven in the same direction as the direction of rotation of the primary magnetic field as indicated by arrow 38 and similarly, the direction of rotation of the rotor of the receiver (assuming proper synchronization) is operating in the corresponding direction as indicated by arrow 39. Rotating magnetic fields of the secondaries are represented by arrows 40 and 41. These secondary rotating magnetic fields are of slip speed, that is to say, their speed of rotation is equal to the difference between the speed of rotation of the primary magnetic field and the speed of mechanical rotation of the rotor.

Figure 5:
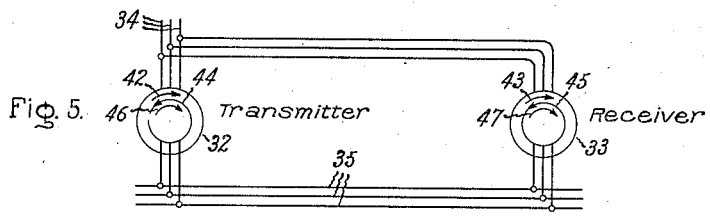

If the transmitter rotor is driven in a direction opposite to the direction of rotation of the primary magnetic field, the direction or relationships are as illustrated in Fig. 5, in which arrows 42 and 43 represent the direction of rotation of the primary magnetic field, arrows 44 and 45 represent the direction of mechanical rotation of the rotors, and arrows 46 and 47 represent the direction of rotation of the secondary magnetic fields.

During synchronous operation of a self-synchronous system of this character, the transmitter and receiver naturally operate at the same speed if they have the same number of poles so that the primary frequencies of transmitter and receiver are the same and the secondary frequencies of the transmitter and receiver are the same.

If, however, the transmitter is already rotating and the receiver is at standstill and connected to the transmitter, there exists in the system a double set of primary and secondary frequencies which have opposite torque effects on the transmitter and receiver units. Since the transmitter unit is mechanically driven, this has very little effect on it, but as the receiver unit must drive the load, it is necessary to know which one of these torques predominates and to control its predomination so that the resultant torque will be in the correct direction to start and accelerate the load in the proper direction.

Figure 6:
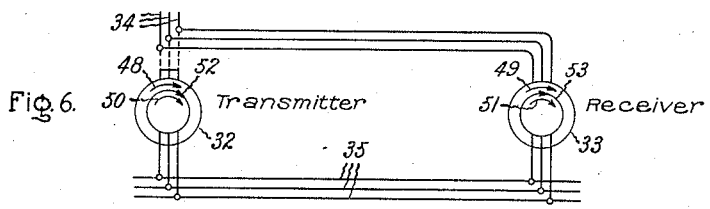

When two forces exist simultaneously in electrical machinery of the character herein described, and neglecting saturation effects, it is possible to consider the forces separately, calculate their separate effects, and then sum them up. Thus a self-synchronous electrical motion transmission system such as described in Fig. 1 may be considered as a system in which the primary winding of the transmitter is short circuited and in which power is supplied to the secondary winding of the transmitter from the source through the receiver unit acting as a wound rotor induction motor, as illustrated diagrammatically in Fig. 6. Since the receiver unit is assumed to be at standstill and further assuming a 60-cycle source of supply, there will be a 60-cycle secondary voltage impressed upon the secondary winding of the transmitter unit, and this combined with the rotation of the transmitter unit will give a varying frequency on the primary winding of the transmitter, which, in effect, is short circuited by the 60-cycle bus. Thus if it is considered that the primary winding of the transmitter is short circuited, then the transmitter acts merely as a combined inductance and resistance across the secondary of the receiver and thus causes this unit to deliver torque in the normal induction motor direction, that is, in the direction of rotation of the primary magnetic field. In Fig. 6 the directions of rotation of the primary magnetic fields of the transmitter and receiver are represented by arrows 48 and 49; the directions of rotation of the secondary magnetic field are represented by arrows 50 and 51. The rotor of the transmitter is assumed to be driven in the direction of rotation of the primary magnetic field as represented by arrow 52, and since the receiver is considered thus far as a wound rotor induction motor having its primary connected to a source and its secondary connected to a combined resistance and reactance, the torque is in the normal induction motor direction and tends to produce rotation of the rotor in the same direction as the direction of rotation of the primary magnetic field as represented by the arrow 53.

Figure 7:
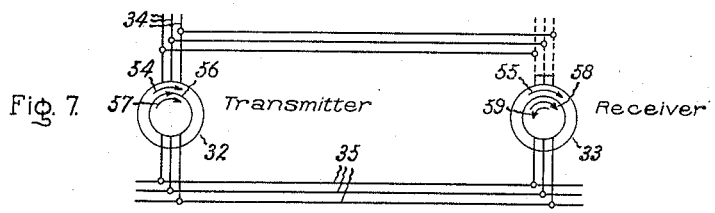

The self-synchronous system of Fig. 1 may also be considered as a system in which the transmitter unit is excited from the 60-cycle bus so that a secondary voltage of varying frequency depending upon the speed of rotation of the rotor of the transmitter is obtained, and in which the receiver unit is again considered as an induction motor which is supplied with this voltage of variable frequency. So considered, the secondary winding of the receiver becomes a primary winding, and the primary winding of the receiver becomes a secondary winding and may be assumed to be short circuited by the 60-cycle bus as diagrammatically illustrated in Fig. 7. If the transmitter is rotating the secondary frequency supplied from the transmitter to the receiver will not be 60 cycles, but will be between zero cycles and 60 cycles when the rotor of the transmitter is rotated in the same direction as the direction of rotation of the primary magnetic field at less than synchronous speed. This secondary voltage being impressed upon the secondary winding of the standstill receiver will appear across the terminals of the stator winding at the same frequency and will in effect be short circuited by the line so that it is permissible to consider the receiver as a wound rotor induction motor with short circuited secondary as indicated in Fig. 7. In Fig. 7 the direction of rotation of the primary magnetic fields of the transmitter and receiver are represented by the arrows 54 and 55. The rotor of the transmitter is driven in this direction as represented by arrow 56, and the direction of rotation of the secondary magnetic field of the transmitter is represented by arrow 57. As previously pointed out, the secondary winding of the receiver as now being considered is in effect the primary winding of a wound rotor induction motor, and the direction of its rotating magnetic field is indicated by the arrow 58, and the direction of rotation of the field of the stator winding which is now in effect the secondary winding is in the direction indicated by arrow 55. When the primary winding of an induction motor is mounted upon the rotor member and an alternating voltage supplied thereto, the rotor member rotates in the opposite direction from that in which the rotating magnetic field of the primary winding rotates. So, if the rotating magnetic field produced by the primary winding is assumed to be rotating in the direction represented by the arrow 58, it will be clear that a torque is produced tending to rotate the rotor member in the opposite direction as represented by the arrow 59.

The direction in which the rotor of the receiver actually rotates when the rotor member of the transmitter is driven in the same direction as the direction of rotation of the primary magnetic field of the transmitter will then depend upon which of these two torques predominates, i. e. whether the torque represented by the arrow 53 when the system is considered as diagrammatically illustrated in Fig. 6, or the torque represented by the arrow 59 when the system is considered as the system diagrammatically illustrated in Fig. 7.

In considering the normal wound rotor induction motor, if the secondary circuit is completely short circuited, the torque at a high slip is considerably less than the torque near synchronous speed as indicated by the speed-torque curves 60 of Fig. 3. However, if secondary resistance is inserted in the circuit, the torque near synchronous speed is very considerably decreased and the torques at higher slip are increased as indicated by the speed-torque curves 61, 62, and 63 of Fig. 3 which indicate the speed-torque characteristics of a wound rotor induction motor for progressively increasing amounts of secondary resistance.

Thus with the receiver at standstill the insertion of resistance in series in the connections between the rotor windings of the transmitter and receiver will very considerably increase the torque represented by the arrow 53 in Fig. 6 which tends to rotate the rotor of the receiver in the same direction as the direction of rotation of the primary magnetic field. The reason for this is that series resistance in the rotor connection acts as series resistance in the secondary circuit of a wound rotor induction motor when the system is considered as diagrammatically represented in Fig. 6, and a high standstill torque such as represented by the curve 63 in Fig. 3 is produced. On the other hand, when the system is considered as diagrammatically represented in Fig. 7, the series resistance in the connections between the rotor windings acts as resistance in the primary circuit of a wound rotor induction motor and thus reduces the torque represented by the arrow 59 in Fig. 7 which tends to produce rotation of the rotor in a direction opposite to the direction of rotation of the primary magnetic field. Thus by connecting resistors 20 to 28 inclusive in series relationship in the connections 17, 18, and 19 between the secondary windings of the transmitter 13 and receiver 14 in Fig. 1, the torque tending to produce rotation of the rotor of the receiver in the same direction as the rotation of the primary magnetic field is considerably increased, while the torque tending to produce rotation of the rotor in the opposite direction is considerably reduced, and consequently, the rotor of the receiver is accelerated in the direction of rotation of the primary magnetic field, which is the correct direction under the conditions assumed.

As the receiver accelerates, it will be necessary to short circuit this resistance progressively in order to maintain the best value of receiver torque and also to complete the acceleration. This is accomplished by closing the switch 64, which completes an energizing circuit for the contactor 29 which closes in response to energization to short circuit resistors 20, 23, and 26. After an interval of time determined by the setting of time element device 65, an energizing circuit is completed for the operating coil of contactor 30 which, in turn, closes to short circuit resistors 21, 24, and 27, and similarly, after a further interval of time determined by the setting of time element device 66, contactor 31 closes to short circuit resistors 22, 25, and 28, thereby completing the acceleration and effecting complete synchronization of the transmitter and receiver units.

Figure 8:
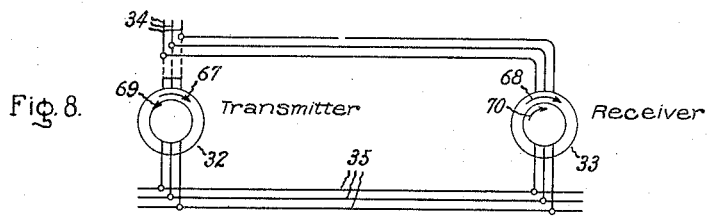
Figure 9:
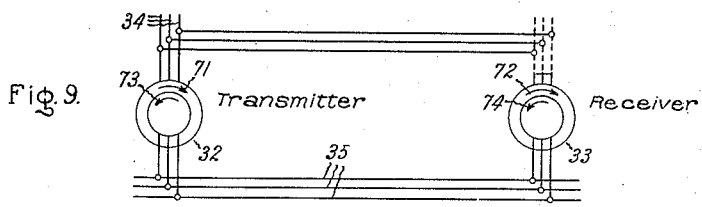

If it is desired to operate the rotors of the transmitter and receiver in a direction opposite to the direction of rotation of the primary magnetic field, the phase rotations of the secondary circuits are not changed with respect to the primary, but the rotor frequency increases from the line frequency value instead of decreasing. Thus when starting the receiver unit it is desired to cause the torque component in the receiver which tends to make the rotor run against the direction of rotation of the primary magnetic field predominate over the torque which tends to cause it to rotate in the same direction. In Figs. 8 and 9 the systems are the same as considered in Figs. 6 and 7 with the exception that the rotor of the transmitter is mechanically rotated in a direction opposite to the direction of rotation of the primary magnetic field.

In Fig. 8 the directions of rotation of the stator field are represented by arrows 67 and 68, the direction of rotation of the rotor of the transmitter is represented by arrow 69, and the torque tending to produce rotation of the rotor of the receiver in the same direction as the stator field is represented by the arrow 70. In Fig. 9 as in Fig. 7 in which the transmitter is considered merely as a frequency converter applying a given frequency to the rotor circuit of the receiver and with the stator circuit of the receiver short circuited, the directions of rotation of the stator fields of the transmitter and receiver are represented by arrows 71 and 72, and the mechanical rotation of the rotor of the transmitter is represented by arrow 73, and the direction of the torque tending to produce rotation of the rotor of the receiver is represented by arrow 74. The direction in which the rotor of the receiver actually rotates will depend upon which of the torques represented by the arrows 70 or 74 predominates, and since it is desired that the rotor of the receiver shall rotate in a direction opposite to the direction of rotation of the stator field, it is therefore necessary that the torque represented by the arrow 74 shall predominate. As previously pointed out, this torque can be made greater by inserting series resistance in the secondary circuit of the receiver considered to be operating as an induction motor which in this case considering the inverted operation, really is the stator circuit of the receiver. In other words, inserting series resistance in the connections between the stator winding of the receiver and the source increases the standstill torque of the receiver represented by the arrow 74 in Fig. 9, which tends to cause the rotor of the receiver to turn in a direction opposite to the direction of the primary magnetic field. On the other hand, considering the receiver as a wound rotor induction motor having its primary winding connected to the source as in Fig. 8, and its secondary winding short circuited by the transmitter, resistance included in series in the connections between the source and the primary winding of the receiver reduces the torque represented by the arrow 70, which tends to rotate the rotor in the same direction as the rotation of the primary magnetic field.

Therefore, if it is desired that the rotors of the transmitter and receiver shall operate in a direction opposite to the direction of rotation of the primary magnetic field, resistors 75 to 83 inclusive are included in series relationship in the connections 84 between the source 85 and the primary winding 86a of receiver 86. These resistors 75 to 83 inclusive are similar to the resistors 20 to 28 inclusive of Fig. 1. The phases of the secondary winding 86a are connected to corresponding phases of the secondary winding 87b of transmitter 87 by means of connections 88. As indicated, no resistors are connected in the connections 88. With this arrangement, when the disconnecting switch 89 is closed, and assuming the rotor of the transmitter 87 to be driven by the motor 90 in a direction opposite to the direction of rotation of the primary magnetic field of the transmitter, the torque tending to produce rotation of the receiver rotor in a direction opposite to the direction of the primary magnetic field will be increased, whilst the torque tending to produce rotation in the opposite direction will be decreased. Consequently, the rotor of the receiver will be accelerated in the desired direction. As the receiver accelerates, it will be necessary to short circuit the resistors 75 to 83 progressively as in the system of Fig. 1, and this is accomplished by closing the switch 91. As a result of this, the contactors 92, 93, and 94 close in the order named to short circuit the resistors 75 to 83 inclusive, thereby to accelerate the receiver and to complete the synchronization.

Although in accordance with the provisions of the patent statutes, this invention is described as embodied in concrete form, it will be understood that the apparatus shown is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States, is:

1. In combination, an electrical motion transmitting device having a primary winding connected to a source and a secondary winding, an electrical motion receiving device having a primary winding and a secondary winding, means for driving the rotor member of said transmitting device, electrical connections from the primary winding of said receiving device to said source and from the secondary winding of said receiving device to the secondary winding of said transmitting device whereby component torques are produced tending to turn the rotor of said receiving device in opposite directions, and means for accelerating said receiving device in a direction corresponding to the direction of rotation of said transmitting device comprising resistance connected in series relationship in one of said connections for reducing one of said component torques and increasing the other of said component torques.

2. In combination, an electrical motion transmitting device having a primary winding connected to a source and a secondary winding, an electrical motion receiving device having a primary winding and a secondary winding, driving means connected to the rotor member of said transmitting device, electrical connections from the primary winding of said receiving device to said source and from the secondary winding of said receiving device to the secondary winding of said transmitting device whereby component torques are produced tending to turn the rotor of said receiving device in opposite directions, and means for accelerating said receiving device in a direction corresponding to the direction of rotation of the rotor of said transmitting device comprising resistors connected in series relationship in one of said connections for increasing the said torque tending to produce rotation in a direction corresponding to the direction of rotation of said transmitting device and for decreasing the said torque tending to produce rotation in the opposite direction.

3. In combination, an electrical motion transmitting device having a primary winding connected to a source and a secondary winding, an electrical motion receiving device having a primary winding and a secondary winding, means for driving the rotor member of said transmitting device, electrical connections from the primary winding of said receiving device to said source, and electrical connections from the secondary winding of said receiving device to the secondary winding of said transmitting device whereby torques are produced tending to rotate the rotor of said receiving device in opposite directions and means for accelerating said receiving device and for synchronizing said receiving device with said transmitting device comprising resistances connected in series relationship in one of said connections for increasing the torque tending to produce rotation in a direction corresponding to the direction of rotation of the transmitter and for reducing the torque tending to produce rotation in the opposite direction, and means for progressively short circuiting said resistances.

4. In combination, an electrical motion transmitting device having stator and rotor members, one of said members being provided with a polyphase primary winding connected to a source of supply and the other of said members being provided with a polyphase secondary winding, means for driving said rotor member in the direction of the rotating magnetic field of said primary winding, an electrical motion receiving device having stator and rotor members, one of said members being provided with a polyphase primary winding and the other being provided with a polyphase secondary winding, electrical connections from said last-mentioned primary winding to said source and electrical connections for interconnecting said secondary windings whereby torques are produced tending to rotate the rotor of said receiving device in opposite directions, and means for accelerating said receiving device and synchronizing said receiving device with said transmitting device comprising resistances connected in series relationship in the connections between said secondary windings for increasing the torque tending to rotate the rotor of said receiving device in the direction of rotation of the primary rotating magnetic field and for reducing the torque tending to produce rotation in the opposite direction.

5. A self-synchronous drive comprising in combination, a polyphase source of power, an electrical motion transmitting device having stator and rotor members, one of said members being provided with a polyphase primary winding connected to said source and the other member being provided with a polyphase secondary winding, means for driving said rotor member in the direction of rotation of the primary rotating magnetic field, an electrical motion receiving device having stator and rotor members, one of said members being provided with a polyphase primary winding connected to said source and the other of said members being provided with a polyphase secondary winding and electrical connections interconnecting corresponding phases of said secondary windings whereby torques are produced tending to rotate the rotor of said receiving device in opposite directions, means for accelerating said receiving device and synchronizing said receiving device with said transmitting device comprising a resistor connected in each of said connections between corresponding phases for increasing the torque tending to rotate the rotor member of said receiving device in the direction of the primary rotating magnetic field and for reducing the other of said torques, and switching means for progressively short circuiting said resistances.

6. In combination, a polyphase source of power, an electrical transmitting device having stator and rotor members, one of said members being provided with a polyphase primary winding connected to said source and the other of said members being provided with a polyphase secondary winding, means for driving said rotor member in a direction opposite to the direction of rotation of the primary rotating magnetic field, an electrical motion receiving device having stator and rotor members, one of said members being provided with a polyphase primary winding and the other of said members being provided with a polyphase secondary winding, electrical connections from said primary winding to said source and electrical connections from the secondary winding of said receiving device to the secondary winding of said transmitting device whereby torques are produced tending to rotate the rotor of said receiving device in opposite directions, and means for accelerating said receiving device and for synchronizing said receiving device with said transmitting device comprising means for increasing the said torque tending to rotate the rotor in a direction opposite to the direction of rotation of the primary magnetic field and for decreasing the other of said torques.

7. In combination, a polyphase source of power, an electrical transmitting device having stator and rotor members, one of said members being provided with a polyphase primary winding connected to said source and the other of said members being provided with a polyphase secondary winding, means for driving said rotor member in a direction opposite to the direction of rotation of the primary rotating magnetic field, an electrical motion receiving device having stator and rotor members, one of said members being provided with a polyphase primary winding and the other of said members being provided with a polyphase secondary winding, electrical connections from the primary winding of said receiving device to said source and electrical connections from the secondary winding of said receiving device to the secondary winding of said transmitting device whereby torques are produced tending to rotate the rotor of said receiving device in opposite directions, and means for accelerating said receiving device and for synchronizing said receiving device with said transmitting device comprising resistance connected in series in said connections between the primary winding of said receiving device and said source for increasing the torque tending to rotate the rotor of said receiving device in a direction opposite to the direction of rotation of the primary magnetic field.

8. A self synchronous drive comprising in combination, a polyphase source of electric power, an electrical motion transmitting device having stator and rotor members, one of said members being provided with a polyphase primary winding connected to said source and the other being provided with a polyphase secondary winding, means for driving said rotor member in a direction opposite to the direction of rotation of the primary rotating magnetic field, an electrical motion receiving device having stator and rotor members, one of said members being provided with a polyphase primary winding and the other being provided with a polyphase secondary winding, electrical connections from the primary winding of said receiving device to said source and electrical connections between corresponding phases of said secondary windings whereby torques are produced tending to rotate the rotor of said receiving device in opposite directions, and means for accelerating said receiving device and for synchronizing said receiving device with said transmitting device comprising resistors in the connections between the primary winding of said receiving device and said source for increasing the torque tending to rotate the rotor of said receiving device in a direction opposite to the rotation of the primary magnetic field and for reducing the torque tending to rotate said rotor in the direction of rotation of said primary magnetic field and switching means for progressively short circuiting said resistors.

DAVID R. SHOULTS.